US012759180B2

(12) United States Patent
Slistan et al.

(10) Patent No.: US 12,759,180 B2
(45) Date of Patent: Oct. 13, 2026

(54) TUBE HANDLING ASSEMBLY FOR SLIT TUBE MANUFACTURING MACHINE

(71) Applicant: TE Connectivity Solutions GmbH, Schaffhausen (CH)

(72) Inventors: Angel Alberto Slistan, Middletown, PA (US); Sun Kyu Pak, Middletown, PA (US); Roberto Francisco-Yi Lu, Middletown, PA (US); Shu Wang, Middletown, PA (US); Craig Roper, Middletown, PA (US); Xinping Deng, Middletown, PA (US); Edward T. Price, III, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 135 days.

(21) Appl. No.: 18/942,927

(22) Filed: Nov. 11, 2024

(65) Prior Publication Data

US 2026/0131496 A1 May 14, 2026

(51) Int. Cl.

*B26D 7/01* (2006.01)
*B26D 3/00* (2006.01)
*B26D 7/06* (2006.01)
*B26D 7/27* (2006.01)

(52) U.S. Cl.

CPC ............... *B26D 7/01* (2013.01); *B26D 3/001* (2013.01); *B26D 7/0616* (2013.01); *B26D 7/0683* (2013.01); *B26D 7/27* (2013.01)

(58) Field of Classification Search

CPC ......... B26D 7/01; B26D 3/001; B26D 7/0616
See application file for complete search history.

(56) References Cited

U.S. PATENT DOCUMENTS 2,338,210 A * 1/1944 Henry ..................... B29C 57/00 264/154
3,611,847 A * 10/1971 Derman ............. B29D 99/0053 82/47
3,905,736 A * 9/1975 Bringman ................ D04H 1/56 264/165
3,988,409 A * 10/1976 Holden .................... B26D 7/14 29/527.2
4,291,453 A * 9/1981 Mathieu ................. B26D 7/084 156/428
2019/0105232 A1* 4/2019 Fallah ................... A61J 7/0007
2019/0291169 A1* 9/2019 Teegavapu .............. B21C 47/26
2019/0335954 A1* 11/2019 Chen ........................ B26D 7/00
2026/0054405 A1* 2/2026 Zhang ...................... B26D 1/62

* cited by examiner

*Primary Examiner* — Sean M Michalski

(57) ABSTRACT

A tube handling assembly for a slit tube manufacturing machine used to manufacture slit tubes each having a tube body and a slit extending a slit length along the tube body includes a base and a tube support movably coupled to the base. The tube handling assembly includes a pin actuator coupled to the tube support having a pin movable relative to the tube support between an extended position and a retracted position and configured to be inserted into an end of the tube body to hold the slit tube. The pin is retractable to release the slit tube. The tube handling assembly includes a tube linear actuator moving the tube support and the pin in a linear actuation direction. The tube handling assembly includes a tube rotation actuator moving the tube support and the pin relative to the base in a rotation actuation direction.

20 Claims, 3 Drawing Sheets

TUBE HANDLING ASSEMBLY FOR SLIT TUBE MANUFACTURING MACHINE

BACKGROUND OF THE INVENTION

The subject matter herein relates generally to slit tube manufacturing machines.

Slit tubes are used in numerous applications. The slit tubes include a slit body, of a predetermined length, having a slit formed at one end of the tube body. Slit tube manufacturing machines are known to form the tube bodies and the slits. The slit tubes are typically removed from the cutting device using a vacuum extraction device. The slit tubes are gathered in a storage bin. However, quality control of the slit tubes may be problematic with such manufacturing machines. For example, there is no known way of inspecting the parts prior to gathering in the storage bins. Rather, after manufacture, the parts may be sample inspected. However defective parts may be missed by sample inspection leading to customer complaints.

There is a need for in-line inspection of slit tubes during the slit tube manufacturing process.

BRIEF DESCRIPTION OF THE INVENTION

In one embodiment, a tube handling assembly for a slit tube manufacturing machine used to manufacture slit tubes each having a tube body and a slit extending a slit length along the tube body is provided. The tube handling assembly includes a base and a tube support movably coupled to the base. The tube handling assembly includes a pin actuator coupled to the tube support. The pin actuator includes a pin movable relative to the tube support between an extended position and a retracted position. The pin configured to be inserted into an end of the tube body to hold the slit tube. The pin is retractable to the retracted position to release the slit tube. The tube handling assembly includes a tube linear actuator configured to move the tube support and the pin relative to the base in a linear actuation direction to move the slit tube held on the pin in the linear actuation direction. The tube handling assembly includes a tube rotation actuator configured to move the tube support and the pin relative to the base in a rotation actuation direction to move the slit tube held on the pin in the rotation actuation direction.

In another embodiment, a slit tube manufacturing machine used to manufacture slit tubes each having a tube body and a slit extending a slit length along the tube body is provided. The slit tube manufacturing machine includes a tube cutting assembly at a cutting zone of the slit tube manufacturing machine. The tube cutting assembly has a cutting blade configured to cut the tube body from a spool of tubing. The tube cutting assembly has a slitting blade configured to cut the slit into the tube body. The slit tube manufacturing machine includes a vision inspection system has a camera for imaging the tube body and the slit. The slit tube manufacturing machine includes a tube handling assembly for handling the split tube for the vision inspection system. The tube handling assembly includes a base and a tube support movably coupled to the base. The tube handling assembly includes a pin actuator coupled to the tube support and includes a pin configured to be inserted into an end of the tube body to hold the slit tube at the cutting zone. The tube handling assembly includes a tube linear actuator configured to move the tube support and the pin from the cutting zone in a linear actuation direction. The tube handling assembly includes a tube rotation actuator configured to move the tube support and the pin in a rotation actuation direction to move the slit tube relative to the camera in the rotation actuation direction.

In a further embodiment, a method of manufacturing a slit tube is provided. The method feeds tubing to a tube cutting assembly at a cutting zone of a slit tube manufacturing machine. The methods cuts a tube body to length from the tubing and slits the tube body to form a slit in the tube body. The method picks up the tube body using a tube handling assembly and rotates the tube body using the tube handling assembly to align the slit with a camera of a vision inspection system. The method moves the tube body away from the cutting zone using the tube handling assembly and images the tube body and the slit for quality inspection of the slit tube.

DETAILED DESCRIPTION OF THE INVENTION

Figure 1:
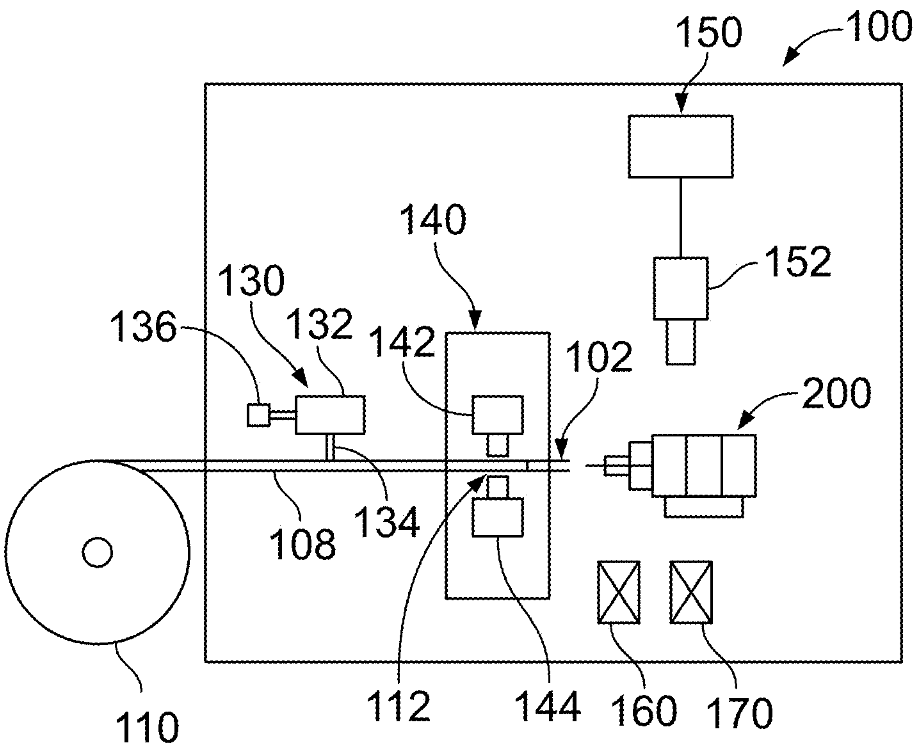
FIG. 1 is a schematic view of a slit tube manufacturing machine in accordance with an exemplary embodiment.

FIG. 1 is a schematic view of a slit tube manufacturing machine 100 in accordance with an exemplary embodiment. The slit tube manufacturing machine 100 is used to manufacture slit tubes 102 (shown in FIG. 2), which may be used in various applications. In an exemplary embodiment, each slit tube 102 includes a tube body 104 having a slit 106 extending a length along the tube body 104. The slit 106 may be provided at one of the ends of the tube body 104.

In an exemplary embodiment, the slit tubes 102 may be manufactured continuously from tubing 108, which may be wound on a reel 110. For example, the tube body 104 may be simulated from the tubing 108 by the slit tube manufacturing machine 100. For example, the tubing 108 may be cut to length to form the tube bodies 104 from the tubing 108. The slits 106 may be cut into the tube bodies 104 by the slit tube manufacturing machine 100. In an exemplary embodiment, the slit tube manufacturing machine 100 performs in-line quality inspections of the slit tubes 102 during the manufacture process. For example, the slit tube manufacturing machine 100 may include a machine vision inspection system that inspects each of the slit tubes 102. The slit tube manufacturing machine 100 may segregated the slit tubes 102 based on the in-line quality inspections, such as into a scrap bin and a save bin based on the quality inspections. The manufacturing process may be stopped if failing parts are detected, such as to correct the machine set-up parameters or to fix broken tools.

In an exemplary embodiment, the slit tube manufacturing machine 100 includes one or more stations used for processing the slit tubes 102. The stations may be incorporated into a single machine. For example, the stations may be incorporated into a single enclosure or cabinet and/or may be mounted to a common frame or base. In other various embodiments, the stations may be arranged in an assembly line, such as being incorporated into multiple machines at different locations within a manufacturing facility.

In an exemplary embodiment, the slit tube manufacturing machine 100 includes a tube feeder 130 used to feed the tubing 108 between the various stations. The tube feeder 130 includes a feed device 132 configured to feed the tubing 108 from the reel 110 to one or more of the stations. For example, the feed device 132 may feed the tubing 108 to a cutting zone 112 of the slit tube manufacturing machine 100.

In an exemplary embodiment, the feed device 132 includes a gripper 134 configured to grip the tubing 108 and advance the tubing 108 through the slit tube manufacturing machine 100. The gripper 134 may include fingers configured to grip the tubing 108. In alternative embodiments, the gripper 134 may include vacuum elements configured to hold the tubing 108 by vacuum pressure. Other types of grippers may be used in alternative embodiment.

In an exemplary embodiment, the feed device 132 may include an actuator 136, such as a linear actuator, used to move the tubing 108. For example, the actuator 136 may be an electro-mechanical actuator configured to advance the gripper 134 a predetermined length associated with the desired length of slit tubes 102. Other types of actuators may be used in alternative embodiments.

Other type of feed device 132 may be used in alternative embodiments. For example, the feed device 132 may include a conveyor used to convey the tubing 108 to the various stations. In other various embodiments, the feed device 132 may include a robot having one or more articulated robot arms configured to pick and place the tubing at the various stations. For example, the robot may be a multi-axis robot, such as a six-axis robot.

In an exemplary embodiment, the slit tube manufacturing machine 100 includes a tube cutting assembly 140 at the cutting zone 112. The tube cutting assembly 140 includes a cutting blade 142 configured to cut the tube body 104 from the spool of tubing 108. The tube cutting assembly 140 includes a slitting blade 144 configured to cut the slit 106 into the tube body 104. The cutting blade 142 may be oriented perpendicular to the length of the tubing 108 to cut across the tubing 108 to singulate the tube body 104 from the tubing 108. The slitting blade 144 may be oriented parallel to the length of the tubing 108 to cut the slit 106 lengthwise along the tube body 104.

The cutting blade 142 may be mounted to an actuator used to move the cutting blade 142 in a cutting direction. The actuator may be operated based on a timing sequence of the slit tube manufacturing machine 100, such as corresponding to operation of the tube feeder 130. The actuator may be operated based on signals from a position sensor used to sense a position of the tubing 108. For example, the position sensor may be located a distance from the cutting blade 142, which corresponds to the desired length of the tube body 104.

In an exemplary embodiment, the slitting blade 144 is used to form the slit 106 at an end of the tube body 104, such as the end of the tube body 104 cut by the cutting blade 142. The slitting blade 144 may be mounted to an actuator used to move the slitting blade 144 in a cutting direction. The actuator may be operated based on a timing sequence of the slit tube manufacturing machine 100, such as corresponding to operation of the actuator of the cutting blade 142. In various embodiments, the slitting blade 144 may be controlled independent of the cutting blade 142. For example, the slitting blade 144 may be actuated after the cutting blade 142 has cut through the tubing 108 to cingulate the tube body 104 from the tubing 108. In other various embodiments, the slitting blade 144 in the cutting blade 142 may be controlled as a unit. For example, a single actuator may move both the cutting blade 142 in the slitting blade 144 simultaneously.

In an exemplary embodiment, the slit tube manufacturing machine 100 includes a visual inspection system 150 used to perform a quality inspection of the slit tube 102. The visual inspection system 150 includes a camera 152 downstream of the tube cutting assembly 140. The camera 152 is used to image the slit tube 102, such as the tube body 104 and/or the slit 106. The visual inspection system 150 analyzes the image to perform the quality inspection. For example, the visual inspection system 150 may determine a tube length of the tube body 104. The visual inspection system 150 may determine a slit length of the slit 106. The visual inspection system 150 may determine if the tube body 104 has any damage.

In the exemplary embodiment, the slit tube manufacturing machine 100 is configured to discard the slit tubes 102 based on the quality inspections. For example, the slit tube manufacturing machine 100 may discard passing slit tubes 102 that pass the quality inspection into a save bin 160. The slit to manufacturing machine 100 may discard failing slit tubes 102 that failed the quality inspection into a scrap bin 170. As such, the slit tubes 102 are automatically separated and segregated based on the quality inspections.

In an exemplary embodiment, the slit tube manufacturing machine 100 includes a tube handling assembly 200. The tube handling assembly 200 handles the slit tubes 102. For example, the tube handling assembly 200 may move the simulated slit tubes 102 from the tube cutting assembly 140. The tube handling assembly 200 handles the slit tubes 102 during the quality inspection process. For example, the tube handling assembly 200 may position the slit tubes 102 relative to the camera 152 for the quality inspection process. The tube handling assembly 200 may move the slit tubes 102 after imaging and analysis to the save bin 160 or the scrap bin 170 based on the quality inspection.

Figure 2:
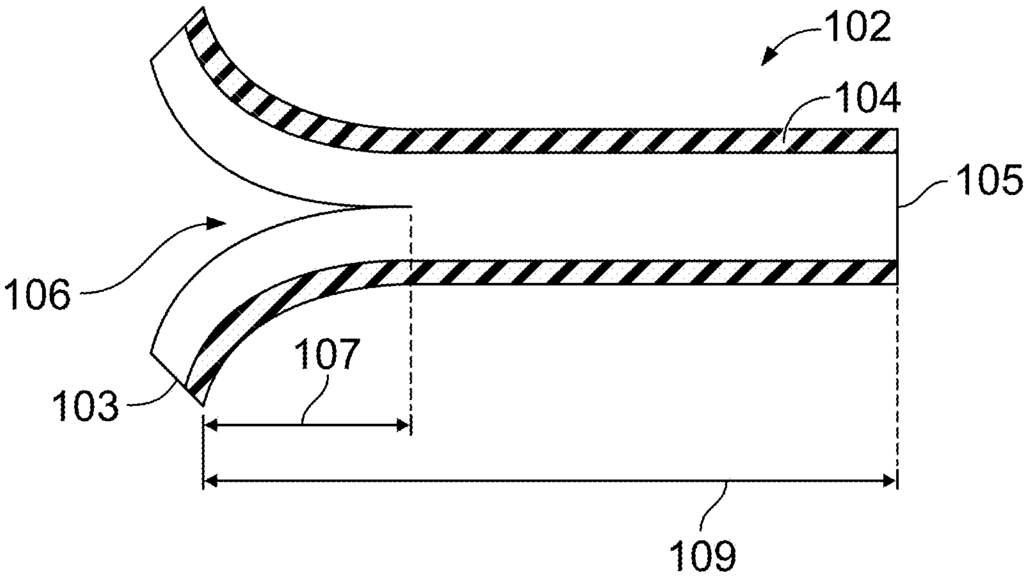
FIG. 2 illustrates one of the slit tubes in accordance with an exemplary embodiment.

FIG. 2 illustrates one of the slit tubes 102 in accordance with an exemplary embodiment. The slit tube 102 includes the tube body 104 extending between a first end 103 and a second end 105. The slit tube 102 includes the slit 106 at the first end 103. The slit 106 may be formed through one or both sides of the tube body 104. The slit 106 extends a slit length 107 along the tube body 104. The slit length 107 may be approximately half of an overall tube length 109 of the tube body 104. However, the slit length may be longer or shorter than half the tube length 109 in alternative embodiments.

In an exemplary embodiment, the quality inspection process may inspect the overall tube length 109 and/or the slit length 107. The quality inspection process may inspect the tube body 104 for damage. The quality inspection process may determine that the slit 106 properly extends to the first end 103 and/or properly extends through one or both sides of the tube body 104. Other characteristics of the slit tube 102 may be inspected by the quality inspection.

Figure 3:
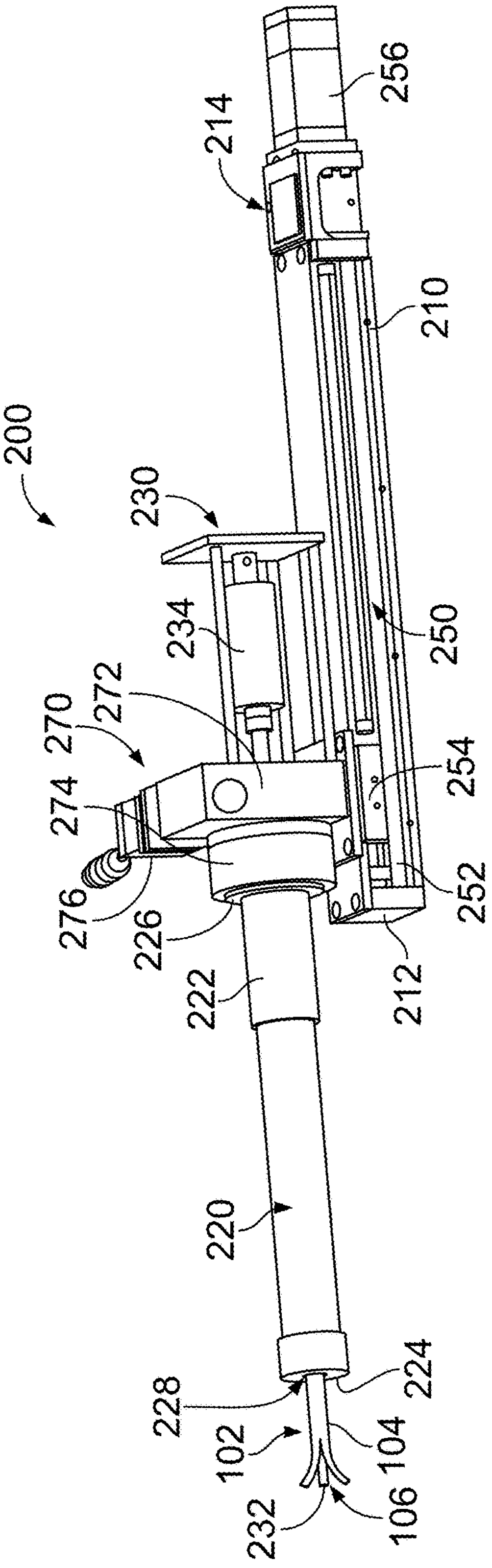
FIG. 3 illustrates the tube handling assembly in accordance with an exemplary embodiment in a first state.
Figure 4:
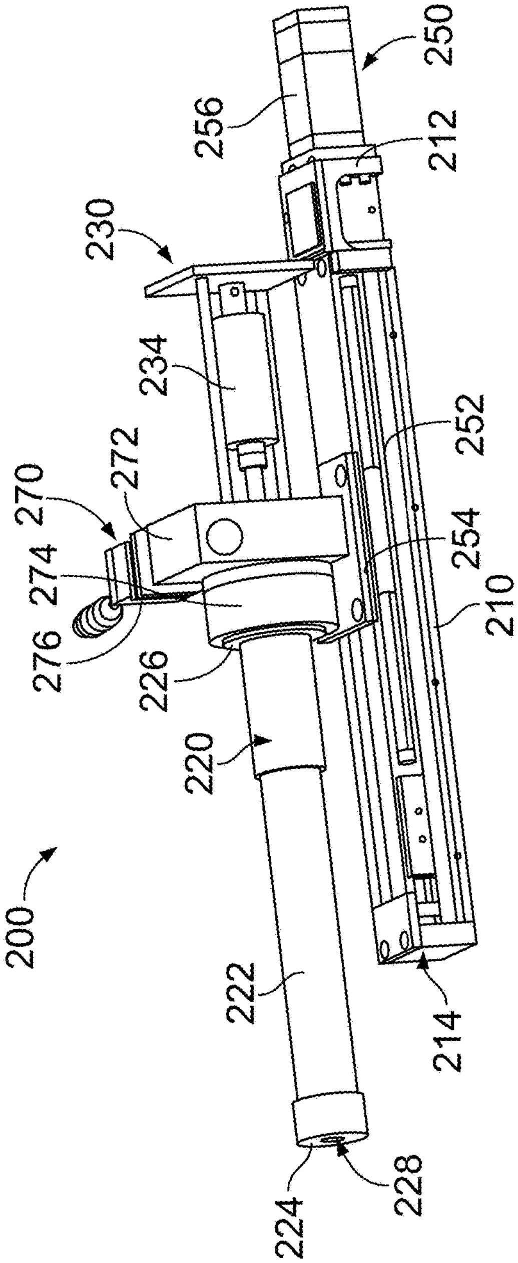
FIG. 4 illustrates the tube handling assembly in accordance with an exemplary embodiment in a second state.

FIG. 3 illustrates the tube handling assembly 200 in accordance with an exemplary embodiment in a first state. FIG. 4 illustrates the tube handling assembly 200 in accordance with an exemplary embodiment in a second state. The tube handling assembly 200 is used by the slit tube manufacturing machine 100 for the automated manufacture of the slit tubes 102. The tube handling assembly 200 is used to move the slit tubes 102 relative to the tube cutting assembly 140, the vision inspection system 150, the save bin 160 and the scrap bin 170 (shown in FIG. 1). For example, the tube handling assembly 200 moves the slit tubes 102, after being singulated from the tubing 108, from the tube cutting assembly 140 to the vision inspection system 150 for imaging and quality assessment. The tube handling assembly 200 then moves the slit tubes 102 to the appropriate save bin 160 or the scrap bin 170 based on the quality assessment.

In an exemplary embodiment, the tube handling assembly 200 includes a base 210 and a tube support 220 movably coupled to the base 210. The tube handling assembly 200 includes a pin actuator 230 coupled to the tube support 220. The pin actuator 230 is used to hold the slit tube 102. The tube handling assembly 200 includes a tube linear actuator 250 configured to move the tube support 220 relative to the base 210. The tube linear actuator 250 moves the tube support 220, and thus the slit tube 102, in a linear actuation direction, such as to move the slit tube 102 away from the tube cutting assembly 140 and/or to move the slit tube 102 to the save bin 160 and/or the scrap bin 170. The tube handling assembly 200 includes a tube rotation actuator 270 configured to move the tube support 220 relative to the base 210. The tube rotation actuator 270 moves the tube support 220, and thus the slit tube 102, in a rotation actuation direction, such as to orient the slit tube 102 relative to the camera 152 of the vision inspection system 150 (for example, to align the slit 106 with the camera 152 for imaging the slit 106).

The base 210 includes one or more plates or walls 212 forming a frame 214 used to support the components of the tube handling assembly 200. The walls 212 may be sheet metal pieces, beams, bars, or other structural components. The base 210 may be mounted to the cabinet or other structural elements of the slit tube manufacturing machine 100 to position the tube handling assembly 200 relative to the other components of the slit tube manufacturing machine 100. The base 210 may be fixed relative to the other components of the slit tube manufacturing machine 100.

The tube support 220 is movable relative to the base 210. For example, the tube linear actuator 250 and the tube rotation actuator 270 are located between the tube support 220 and the base 210 to allow movement of the tube support 220 relative to the base 210. In an exemplary embodiment, the tube support 220 includes a support body 222 extending between a first end 224 and a second end 225. The support body 222 may be generally cylindrical, such as including one or more cylindrical sections along a longitudinal axis of the tube support 220. The tube support 220 has an end wall 226 at the first end 224. In an exemplary embodiment, the tube support 220 includes an internal cavity 228 passing through the support body 222. The pin actuator 230 is received in the internal cavity 228. The internal cavity 228 is open through the end wall 226.

The pin actuator 230 includes a pin 232 and a pin actuation element 234 operably coupled to the pin 232. The pin 232 is used to hold the slit tube 102. The pin 232 may be received in the internal cavity 228 of the tube support 220. In an exemplary embodiment, the pin 232 extends along a pin axis coincident with the tube support axis of the tube support 220. In an exemplary embodiment, the pin 232 is configured to extend forward of the end wall 226 to support the slit tube 102. The pin actuation element 234 is operably coupled to the pin 232 to move the pin 232 relative to the tube support 220 between an extended position (FIG. 3) and a retracted position (FIG. 4). When extended, the pin 232 is configured to be inserted into the end of the tube body 104 of the slit tube 102 to hold the slit tube 102. The pin 232 is retractable to the retracted position to release the slit tube 102. For example, the pin 232 may be retracted into the internal cavity 228 to allow the slit tube 102 to release from the tube handling assembly 200. In various embodiments, the pin 232 may have a length and a diameter corresponding to the slit tube 102. Optionally, the pin 232 may be interchangeable, such as with pins 232 of other lengths or other diameters for use with different types of slit tubes 102.

In an exemplary embodiment, the pin actuation element 234 is located at the second end 225 of the tube support 220. The pin actuation element 234 may be mounted to the tube rotation actuator 270 or the tube linear actuator 250. The pin actuation element 234 may be a pneumatic actuator in various embodiments. In other embodiments, the pin actuation element 234 may be an electro-mechanical actuator or other type of actuation device configured to move the pin 232 in a linear actuation direction.

The tube linear actuator 250 is configured to move the tube support 220 and the pin 232 relative to the base 210 in a linear actuation direction (arrow A) to move the slit tube 102 held on the pin 232 in the linear actuation direction. The tube linear actuator 250 is coupled to the base 210. For example, the tube linear actuator 250 is slidable along the base 210. In an exemplary embodiment, the tube linear actuator 250 includes a guide track 252 coupled to the base 210 and a slide 254 slidably coupled to the guide track 252. The tube linear actuator includes a linear actuation element 256 operably coupled to the slide 254. The linear actuation element 256 may be an electro-mechanical actuation device in various embodiments. For example, the linear actuation element 256 may include an electric motor and a drive screw rotated by the motor to move the slide 254 as the drive screw is rotated. In other various embodiments, the linear actuation element 256 may include a pneumatic actuation device or other type of actuation device configured to move the slide 254 in a linear actuation direction.

The slide 254 is configured to move between a forward position at a first end of the guide track 252 and a rearward position at a second end of the guide track 252. In an exemplary embodiment, the tube linear actuator 250 is movable between a pickup position (FIG. 3) and a drop off position (FIG. 4). In the pickup position, the pin actuator 230 is configured to pick up the slit tube 102. For example, the pin 232 may be loaded into the end of the slit tube 102 to engage and hold the slit tube 102. In the drop off position, the slit tube 102 may be released, such as being released into the save bin 160 or the scrap bin 170. The pin 232 may be retracted when the tube linear actuator 250 is in the drop off position allowing the slit tube 102 to release from the tube handling assembly 200. In an exemplary embodiment, the tube linear actuator 250 is movable to multiple drop off positions, such as a first drop off position (FIG. 4, for example identified at point C) and a second drop off position (for example, identified at point D). The first drop off position is associated with the save bin 160 (for example, aligned vertically above the save bin 160) such that the slit tubes 102 passing the quality check are able to be released into the save bin 160 at the first drop off position. The second drop off position is associated with the scrap bin 170 (for example, aligned vertically above the scrap bin 170) such that the slit tubes 102 failing the quality check are able to be released into the scrap bin 170 at the second drop off position.

The tube rotation actuator 270 is configured to move the tube support 220 and the pin 232 relative to the base 210 in a rotation actuation direction (arrow B) to move the slit tube 102 held on the pin 232 in the rotation actuation direction. The tube rotation actuator 270 is coupled to the slide 254. The tube rotation actuator 270 is movable with the slide, such as from the pickup position to the drop off position(s). In an exemplary embodiment, the tube rotation actuator 270 includes a mount 272 mounted to the slide 254 and a hub 274 rotatably coupled to the mount 272. The tube support 220 is coupled to the hub 274. For example, the tube support 220 extends forward of the hub 274. The tube support 220 rotates with the hub 274.

The tube rotation actuator 270 includes a rotation actuation element 276 operably coupled to the hub 274. The rotation actuation element 276 is operated to rotate the hub 274. The tube rotation actuator 270 may be rotatable approximately 360°. The tube rotation actuator 270 may be rotatable in a clockwise direction and/or a counter-clockwise direction. The rotation actuation element 276 may be an electro-mechanical actuation device in various embodiments. For example, the rotation actuation element 276 may include an electric motor coupled to the hub 274 to rotate the hub 274. In other various embodiments, the rotation actuation element 276 may include a pneumatic actuation device or other type of actuation device configured to rotate the hub 274 in the rotation actuation direction. The hub 274 rotates the tube support 220, and thus the pin 232, which allows rotation of the slit tube 102. The slit tube 102 is configured to be rotated to position the slit tube 102 relative to the camera 152 for imaging the slit tube 102. For example, the slit tube 102 may be rotated to align the slit 106 with the camera 152 for imaging the slit 106.

Figure 5:
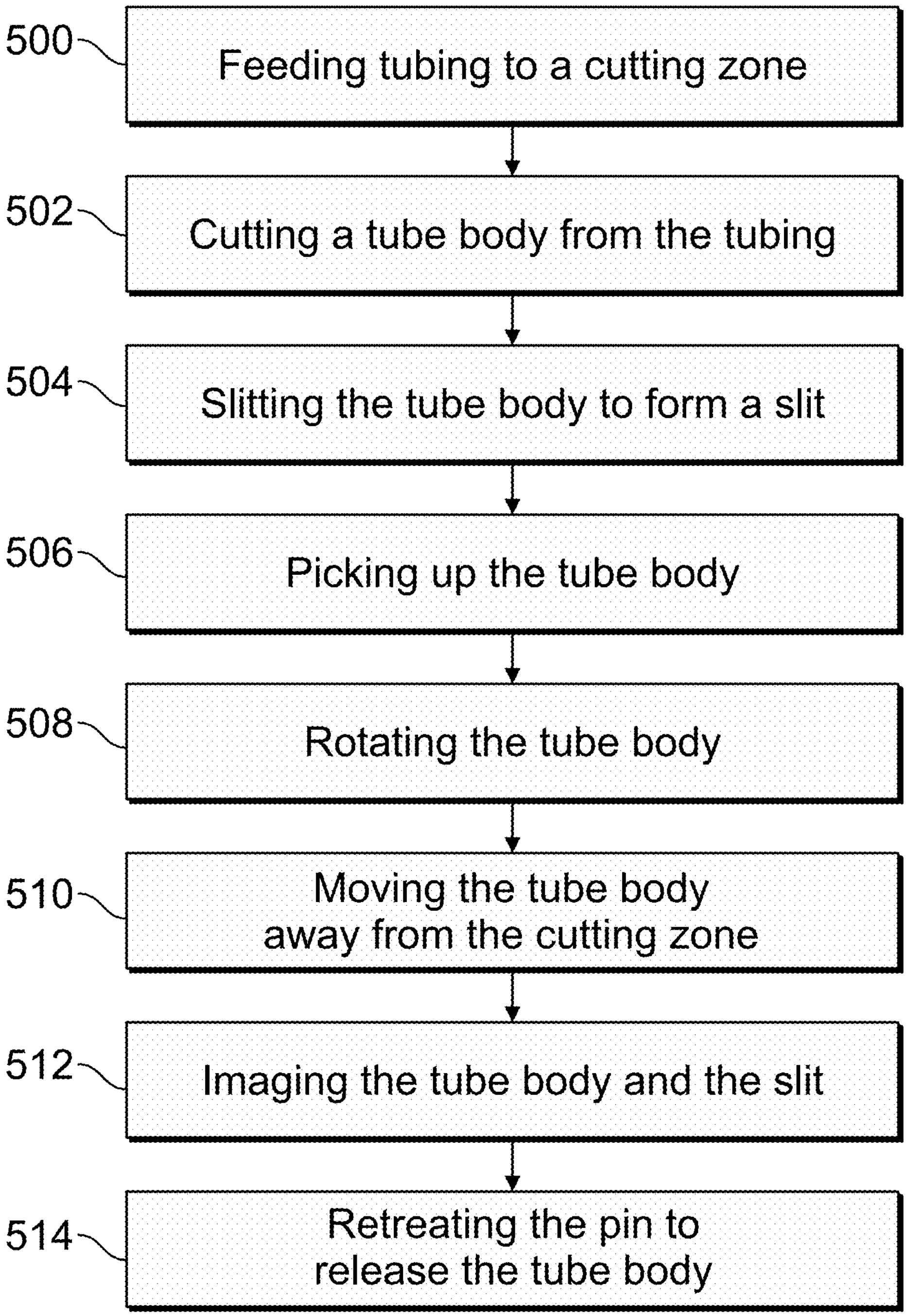
FIG. 5 illustrates a method of manufacturing a slit tube using a slit tube manufacturing machine in accordance with an exemplary embodiment.

FIG. 5 illustrates a method of manufacturing a slit tube using a slit tube manufacturing machine in accordance with an exemplary embodiment.

At 500, the method includes feeding tubing to a tube cutting assembly at a cutting zone of the slit tube manufacturing machine. The tubing may be feed by a tube feeder. For example, the tubing may be gripped and advanced in a feeding direction. The feeding device may feed a predetermined length of the tubing to the tube cutting assembly, such as to control a length of the slit tube.

At 502, the method includes cutting a tube body to length from the tubing. The tube body is cut from the tubing using a cutting blade. The cutting blade may be actuated in a downward direction to cut the tubing. Optionally, multiple cutting blades may be provided to cut the tubing from different sides, such as from above and below.

At 504, the method includes slitting the tube body to form a slit in the tube body. The tube body is slit using a slitting blade. The slitting blade may be actuated in a downward direction to slit an end of the tube body. The tube body may be slit at one side or both sides.

At 506, the method includes picking up the tube body using a tube handling assembly. The pick up process may include inserting a pin of the tube handling assembly in the tube body. The pin may have an outer diameter approximately equal to an internal diameter of the tubing, such as to hold the tube body on the pin by an interference fit. The tube handling assembly may advance the pin in a linear actuation direction to load the pin into the end of the tube body. The pin may be advanced using a tube linear actuator of the tube handling assembly. The pin may be advanced using a pin actuator that moves the pin from a retracted position to an advanced position.

At 508, the method includes rotating the tube body using the tube handling assembly to align the slit with a camera of a vision inspection system. The rotation may be performed by rotating the pin to rotate the tube body. The pin may be rotated using a tube rotation actuator of the tube handling assembly.

At 510, the method includes moving the tube body away from the cutting zone using the tube handling assembly. The tube handling assembly may move the pin, and thus the tube body, in a rearward linear actuation direction. The pin may be moved rearward using a tube linear actuator of the tube handling assembly. The tube handling assembly may move the slit tube into alignment with a camera of the vision inspection system. The tube handling assembly may move the slit tube into alignment with a save bin to deposit the slit tube in the save bin. The tube handling assembly may move the slit tube into alignment with a scrap bin to deposit the slit tube in the scrap bin.

At 512, the method includes imaging the tube body and the slit for quality inspection of the slit tube. The imaging may be performed by a camera of a vision inspection system. The imaging may be used to determine a tube length of the tube body. The imaging may be used to determine a slit length of the slit in the tube body. The imaging may determine if the tube body has any damage. Optionally, the method may include the step of performing a quality inspection of the tube body using the vision inspection system. The vision inspection system analyses the image to perform the quality inspection. In an exemplary embodiment, the tube handling assembly may be controlled or operated based on the imaging. For example, the tube rotation actuator may control rotation of the pin and the slit tube based on the imaging, such as to rotate the pin until the slit is visible in the image. The tube linear actuator may be controlled based on the imaging, such as based on the quality determination. For example, the tube linear actuator may move the tube body to a first drop off position if the tube body passes a quality inspection and may move the tube body to a second drop off position if the tube body fails a quality inspection.

At 514, the method includes retracting the pin from the tube body to release the tube body from the tube handling assembly. The pin may be retracted using a pin actuator that retracts the pin into the tube support. When the pin is retracted, the slit tube is able to fall into a collection area, such as into the save bin or the scrap bin.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A tube handling assembly for a slit tube manufacturing machine used to manufacture slit tubes each having a tube body and a slit extending a slit length along the tube body, the tube handling assembly comprising:

a base;

a tube support movably coupled to the base;

a pin actuator coupled to the tube support, the pin actuator including a pin movable relative to the tube support between an extended position and a retracted position, the pin configured to be inserted into an end of the tube body to hold the slit tube, the pin being retractable to the retracted position to release the slit tube;

a tube linear actuator configured to move the tube support and the pin relative to the base in a linear actuation direction to move the slit tube held on the pin in the linear actuation direction; and a tube rotation actuator configured to move the tube support and the pin relative to the base in a rotation actuation direction to move the slit tube held on the pin in the rotation actuation direction.

2. The tube handling assembly of claim 1, wherein the pin actuator is configured to release the split tube in the retracted position.

3. The tube handling assembly of claim 1, wherein the pin actuator includes a pin actuator element operably coupled to the pin to move the pin between the extended position and the retracted position.

4. The tube handling assembly of claim 1, wherein the tube support includes an end wall, the pin protruding beyond the end wall in the extended position, the pin being recessed behind the end wall in the retracted position.

5. The tube handling assembly of claim 1, wherein the tube linear actuator includes a guide track coupled to the base and a slide slidably coupled to the guide track, the tube support moving relative to the base with the slide.

6. The tube handling assembly of claim 5, wherein the tube rotation actuator is mounted to the slide.

7. The tube handling assembly of claim 1, wherein the tube linear actuator is movable between a pickup position and a drop off position, the pin actuator picking up the slit tube in the pickup position, the pin actuator releasing the slit tube in the drop off position.

8. The tube handling assembly of claim 7, wherein the drop off position is a first drop off position associated with slit tubes passing a quality check, the linear actuator configured to release the slit tube at the first drop off position, the tube linear actuator movable to a second drop off position associated with failing a quality check, the linear actuator configured to release the slit tube at the second drop off position.

9. The tube handling assembly of claim 1, wherein the tube rotation actuator is configured to rotate the pin to rotate the slit tube to align the slit in the tube body with a camera of a vision inspection system to image the slit.

10. The tube handling assembly of claim 1, wherein the tube rotation actuator includes a hub and a tube rotation actuator element operable to rotate the hub, the tube support being mounted to the hub and rotated by the hub.

11. The tube handling assembly of claim 1, wherein the tube rotation actuator is rotatable approximately 360°.

12. The tube handling assembly of claim 1, wherein the pin extends along a pin axis, the tube support extending along a tube support axis coincident with the pin axis.

13. A slit tube manufacturing machine used to manufacture slit tubes each having a tube body and a slit extending a slit length along the tube body, the slit tube manufacturing machine comprising:

a tube cutting assembly at a cutting zone of the slit tube manufacturing machine, the tube cutting assembly having a cutting blade configured to cut the tube body from a spool of tubing, the tube cutting assembly having a slitting blade configured to cut the slit into the tube body;

a vision inspection system having a camera for imaging the tube body and the slit; and a tube handling assembly for handling the split tube for the vision inspection system, the tube handling assembly including a base and a tube support movably coupled to the base, the tube handling assembly including a pin actuator coupled to the tube support and including a pin configured to be inserted into an end of the tube body to hold the slit tube at the cutting zone, the tube handling assembly including a tube linear actuator configured to move the tube support and the pin from the cutting zone in a linear actuation direction, the tube handling assembly including a tube rotation actuator configured to move the tube support and the pin in a rotation actuation direction to move the slit tube relative to the camera in the rotation actuation direction.

14. The slit tube manufacturing machine of claim 13, wherein the tube rotation actuator is operable to align the slit with the camera for imaging the slit.

15. The slit tube manufacturing machine of claim 13, wherein the tube linear actuator is movable between a pickup position and a drop off position, the pin actuator picking up the slit tube in the pickup position, the pin actuator releasing the slit tube in the drop off position after imaging by the vision inspection system.

16. The slit tube manufacturing machine of claim 13, wherein the pin is movable relative to the tube support between an extended position and a retracted position, the pin configured to pick up the slit tube in the extended position, the pin configured to release the slit tube in the retracted position, the tube support includes an end wall, the pin protruding beyond the end wall in the extended position, the pin being recessed behind the end wall in the retracted position.

17. A method of manufacturing a slit tube comprising:

feeding tubing to a tube cutting assembly at a cutting zone of a slit tube manufacturing machine;

cutting a tube body to length from the tubing;

slitting the tube body to form a slit in the tube body;

picking up the tube body using a tube handling assembly;

rotating the tube body using the tube handling assembly to align the slit with a camera of a vision inspection system;

moving the tube body away from the cutting zone using the tube handling assembly; and imaging the tube body and the slit for quality inspection of the slit tube.

18. The method of claim 17, wherein said picking up the tube body comprises inserting a pin of the tube handling assembly in the tube body, said rotating the tube body comprises rotating the pin to rotate the tube body.

19. The method of claim 17, further comprising retracting the pin from the tube body to release the tube body from the tube handling assembly.

20. The method of claim 17, further comprising performing a quality inspection of the tube body using the vision inspection system, wherein said moving the tube body comprises moving the tube body to a first drop off position if the tube body passes a quality inspection and moving the tube body to a second drop off position if the tube body fails a quality inspection.

* * * * *